United States Patent
Carlsson (10) Patent No.: US 8,179,866 B2
(45) Date of Paterson: May 15, 2012

(54) THROUGHPUT OPTIMIZED CARRIER ALLOCATION

(75) Inventor: Roland Carlsson, Öjersjö (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 1058 days.

(21) Appl. No.: 12/089,144

(22) PCT Filed: Oct. 3, 2005

(86) PCT No.: PCT/IB2005/053243
§ 371 (c)(1),
(2), (4) Date: Apr. 3, 2008

(87) PCT Pub. No.: WO2007/039789
PCT Pub. Date: Apr. 12, 2007

(65) Prior Publication Data
US 2008/0247365 A1    Oct. 9, 2008

(51) Int. Cl.
*H04B 7/216* (2006.01)
*H04B 17/00* (2006.01)
*H04W 4/00* (2009.01)
*H04W 36/00* (2009.01)

(52) U.S. Cl. ........ 370/335; 370/329; 455/442; 455/444; 455/67.13

(58) Field of Classification Search .................. 370/335; 455/442, 444, 67.13
See application file for complete search history.

(56) References Cited

U.S. PATENT DOCUMENTS

| 6,704,291 B2 | 3/2004 | Mueckenheim et al. |
| 6,781,974 B1 | 8/2004 | Tsumura |
| 6,804,214 B1* | 10/2004 | Lundh et al. ............... 370/335 |
| 7,349,699 B1* | 3/2008 | Kelly et al. ............... 455/444 |
| 7,801,490 B1* | 9/2010 | Scherzer ............... 455/67.13 |
| 2004/0219920 A1* | 11/2004 | Love et al. ............... 455/442 |

FOREIGN PATENT DOCUMENTS

| JP | A 2002-159047 | 5/2002 |
| WO | WO 02/39755 A1 | 5/2002 |

* cited by examiner

*Primary Examiner* — Ian N Moore
*Assistant Examiner* — Kiet Tang
(74) *Attorney, Agent, or Firm* — Roger S. Burleigh (57) ABSTRACT

A cell plan operation, a Routine and a base station are disclosed wherein user entities are allocated to at least two carriers (C1; C2) in at least one cell (A; B) of a system (node B), the first carrier (C1) having at least a first channel (DPCH), the second carrier (C2) having at least a second channel (DPCH), the at least two carriers not causing interference to one another, wherein user entities (UE) may be selectively assigned to either first channel and/or the second channel. Information is gathered on respective measures relating to the noise enduring capability (MAX ROT(UEn)) of respective prevalent users within the at least one cell. Prevalent user entities are ordered according to their respective noise enduring capabilities (MAX_ROT(UEn)_UE). User entities with low noise enduring capabilities are allocated to a channel on the first carrier (C1), while user entities with high noise enduring capabilities (MAX_ROT(UEn)) are allocated to a channel on the second carrier (C2).

2 Claims, 5 Drawing Sheets

FIG. 1

N_C1 : UE'S ON C1 FOR CELL A
N_C2 : UE'S ON C2 FOR CELL A
N = N_C1 + N_C2

THROUGHPUT OPTIMIZED CARRIER ALLOCATION

FIELD OF THE INVENTION

The present invention relates to power control in communication systems such as code division multiplex access (CDMA) systems. More particularly, the present invention relates to aspects of (high-speed packet) uplink packet access communication, such as enhanced uplink traffic (EUL) in UMTS systems (W-CDMA).

BACKGROUND

As is well known, in wide band direct sequence CDMA systems, signals consist of different pseudo-random binary sequences that modulate a carrier. Thereby, the spectrum of the signals is spread over a wide frequency range common to a number of channels in the system. Due to the direct sequence coding, orthogonality between signals is achieved, enabling individual decoding of signals from the common frequency range.

This coding principle has many advantages. For instance, direct sequence spread spectrum coding provides substantial reductions of the severity of multi-path fading, which leads to an effective utilization of spectrum resources.

Since signals occupy the same space in the frequency/time domain, an exact power regulation of the individual channels is an important aspect of CDMA systems.

CDMA systems employ power control on both the up- and the downlink. One objective of the power control is to regulate each mobile station transmitter operating within the cell site base-station receiver, such that the signals have the same power level at the base-station receiver regardless of the position or propagation loss of the respective mobile stations. It should be noted that the power level, for each user entity (UE), is proportional to the transmission data rate.

When all mobile station transmitters within a cell site are so controlled, then the total signal power at the base-station receiver is equal to the nominal received power times the number of mobile stations provided that all UEs uses the same data rate.

Each selected signal received at the base-station is converted into a signal that carries the narrowband digital information, whereas the other signals that are not selected constitute a wide band noise signal. However, the bandwidth reduction, which is performed according to the decoding process, increases the signal-to-noise ratio from a negative value to a level that allows operation with an acceptable bit error rate.

The overall system capacity, for instance the number of users that can operate within the cell simultaneously, depends on the minimum signal-to-noise ratio, which produces the given acceptable bit error rate.

The 3rd Generation Partnership Project (3GPP) specification standard for the third generation mobile telephony system supports different user data rates for different users.

According to the W-CDMA specification, an uplink packet data session is performed as follows:

A user entity attempting attaching to the network is informed of the random access channel, RACH, carrier available in respective cells. The user entity transmits information regarding its identity and its present transmission uplink power level. As is well known, the output power of each respective user entity is regulated in a stepwise fashion according to a TPC (transmit power control) loop by the base station, node B, in order to avoid abrupt changes.

Since the RACH channel is shared by up-link traffic from all users, it may become congested due to an overly high load. Consequently, the data throughput may be limited under such circumstances.

Therefore, a given user may be allocated a dedicated packet channel, DPCH, that is exclusive for one user entity according to the specified Hadamard code. DPCH channels are available to a given user entity in respective cells and on respective carriers. Alternatively, a user entity may remain on the RACH channel.

The first message from a user entity, UE, to Node B is always sent on the RACH channel, while subsequent messages may be transmitted on either the RACH channel or a DPCH channel. Hence, if no RACH message can be forwarded, the UE cannot initiate access to the network.

The actual interference level in the cell, the user data rate, the channel quality and the requested quality of the data transmission determine the level of the transmission power needed for a user. The uplink transmission is—especially in large cells—often power limited, i.e. the maximum transmission power is not high enough to reach the desired user data rate or transmission quality.

A common way to determine the uplink cell load is to determine the level of the total received power in comparison to the system noise level. This measure is often called 'Rise over Thermal noise' (RoT):

$$ROT = \frac{N\_T + \sum_{UE1}^{UEn} C}{N\_T} \quad (1)$$

whereby N_T is the thermal noise in the receiver of the base station.

For the given link it appears that $$C\_MAX(UEn) = P\_MAX(UEn) - L(UEn) \quad (2)$$

where C_MAX(UEn) is the received maximum power at node B for a user entity transmitting with its maximum allowed power P_MAX at a path loss L, which is mainly dependent on the distance to node B.

The signal to noise ratio of a received signal from a given user entity (e.g. UE1) at node B can be expressed as follows:

$$SIR(UE1) = \frac{C\_MAX(UE1)}{N\_T + \sum_{\neq UE1}^{UEn} C\_MAX(UEn)} \quad (3)$$

$$\approx \frac{C\_MAX(UE1)}{N\_T \cdot ROT}$$

The path loss (UE to Node B) can vary substantially depending on the distance between UE and Node B as well as depending on whether the UE is indoor or outdoor. Moreover the isolation between the own cell and the neighboring cell will differ substantially depending on the position of the UE.

Due to the difficulties of estimating path losses and the nature of initial cell planning, it is a problem to allocate spectrum resources efficiently.

SUMMARY OF THE INVENTION

It is a first object of the present application to provide for an efficient allocation of user entities to respective carriers channels so as to at least prioritize optimizing of throughput and access.

It is a second object of the invention to set forth a throughput optimizing base station.

It is a second object of the invention to provide a throughput optimized cell plan operation.

Further advantages will appear from the following detailed description of the invention.

DETAILED DESCRIPTION OF PREFERRED EMBODIMENTS OF THE INVENTION

Figure 1:
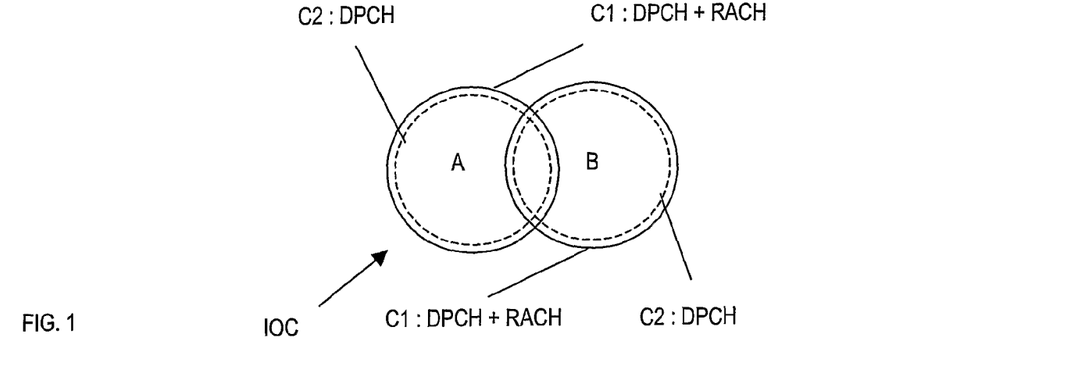
FIG. 1 shows a first embodiment of two cells of a cellular radio system according to the invention.

In FIG. 1, a first embodiment of a cell plan according to the invention having two cells A and B relating to W-CDMA up-link traffic is shown. Carrier frequency C1 carries a plurality of dedicated packet channels DPCH and a random access channel, RACH, while carrier frequency C2 carries a plurality of dedicated packet channels DPCH to which user entities may be individually assigned in time-multiplexed fashion, but no random access channel, RACH. C1 and C2 do not interfere with one another.

All user entities N in the area, UE1-UEn, should be allocated or re-allocated on one of the above two carries on the various channels. Both cells may serve the same user entities in so far there is coverage due to their use of the same channelisation (Hadamard) codes. As is well known from CDMA, user entities may transmit to both cells A and B intermittently or substantially at the same time when being in a state of soft handover.

In the above cell plan of FIG. 1, the data transmission needs of individual user entities and the actual location of user entities varies over time. Consequently, the load in the cell or cells varies over time. As stated above, the aim of the present invention is to accomplish an allocation or re-allocation of user entities in order to optimize throughput at given intervals. From an operator perspective, income is associated with throughput, which ought to be maximized, although this should not come at the cost of deteriorating accessibility. In this respect, output power minimization of user entities—which could lead to prolonged battery life of individual user entities—is considered of a sub-ordinate priority.

Before further dealing with the preferred embodiments, we shall discuss some parameters and definitions according to the invention.

It is a primary condition that the worst situated UE in the cell, e.g. as shown in FIG. 1, can always transmit on the RACH channel. In other words, the transmit power allocation or power needs of individual user entities and potentially the number of user entities admitted into the cell should be controlled in such manner that the resulting actual loads meet the criteria that the worst situated UE in the cell can always transmit on the RACH channel.

According to the invention, a measure relating to the noise enduring capability—MAX_ROT(UEn)—of respective prevalent users within the at least one cell is defined as the maximum carrier load pertaining to a given real prevalent user entity on a given location which is acceptable for that particular UE in order to have its transmission successfully received by the base station. The value depends on the placement and conditions for the given user entity vis-à-vis the other user entities' position and transmission properties in relation to the base station as well as the signal to the interference ratio, SIR, needed for obtaining the given QoS (Quality of Service).

The MAX_ROT(UEn) value can be estimated according to $$MAX\_ROT(UEn) = ((P\_MAX(UEn) - P\_MARGIN)[dBm] - (P\_USED(UEn) - RSSI(UEn))[dBc]) - SIR(UEn)[dBc],$$

whereby
- RSSI(UEn): the measured received signal strength for a specific UE as estimated by the base station.
- P_USED(UEn): the used power for a specific UE. The value is reported for the UE to the base station.
- P_MARGIN: A power margin to ensure that the UE-BASE STATION connection can handle channel variations within a scheduling interval.
- SIR(UEn): The estimated signal to interference ratio for a specific UE as estimated by the base station.

Figure 3:
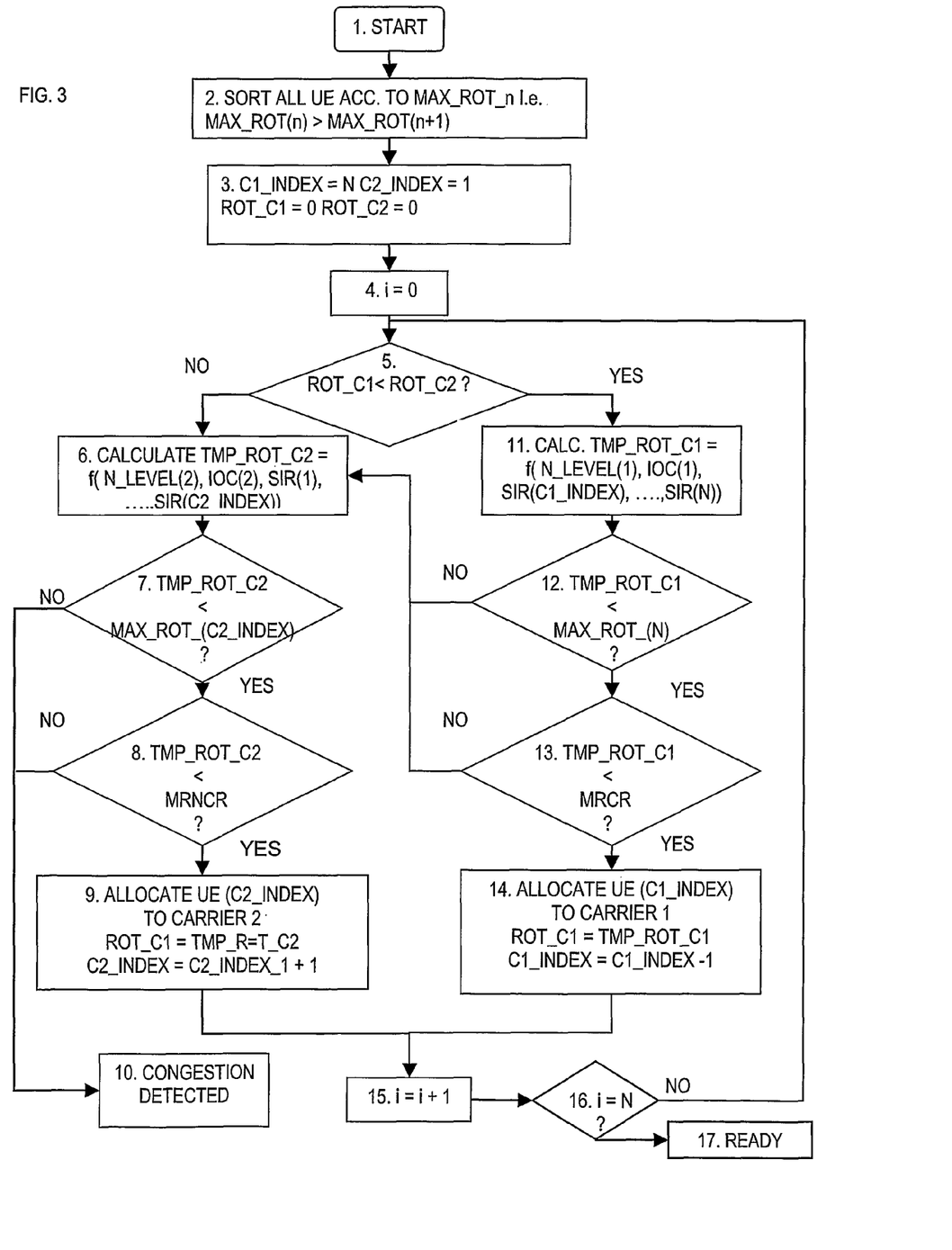
FIG. 3 is a flow diagram for a first distribution routine according to a first embodiment of the invention.

According to a first preferred embodiment of the invention, Node B performs iterative estimations of MAX_ROT for all prevalent user entities in order to allocate or re-allocate resources efficiently. The corresponding allocation routine is shown in FIG. 3.

As mentioned above, the total load on the carrier can be characterized by ROT. In this context the load on the respective carriers are denoted ROT_C1 and ROT_C2.

However, it cannot be assumed that the prevalent worst-case user entity (minimum MAX_ROT(UEn)) in a given situation represents the possible worst-case situation. Therefore, for cell-planning purposes, a predetermined maximum load—for guaranteed RACH coverage (e.g. in the present context of FIG. 1: the coverage of RACH carrier C1), MRCR—is defined.

The MRCR value is set in such a manner that a thought of given UE, having the maximum possible path loss that expectedly can arise within the desired cell coverage area, can forward its first RACH message to Node B. In other words, MRCR should be selected so that an UE with a specific maximum path loss can always transmit at a specific minimum data rate. Moreover, MRCR should be selected so that the interference to neighboring cells is not exceeding a given level.

There are several aspects associated with determining a proper MRCR value in order to limit the actual load, ROT. Among others, it is noted that
- the higher the load is for a given cell, the higher is the upper achievable uplink transmission data rate in the cell;
- the higher the load is for a given cell, the higher is the interference arising in the neighboring cells;
- the higher the load is for a given cell, the higher uplink power the UE has to use in order to achieve a given data rate.

Consequently, if the MRCR is set too high, UEs in the cell having large path losses (e.g. UEs at cell border or indoor UEs) may not be able to transmit with the desired (minimum) data rate despite that the UEs are using their maximum transmission power.

Further Definitions
  N: Number of UEs in the cell
  C_INDEX: an order number (1-N) for each channel to which individual user entities (UE1-UEn) are assigned.
  i: routine iteration number
  N_LEVEL(C): the thermal noise figure for the used carrier.
  IOC(C): The estimated interference from neighboring cells for the given carrier. The interference can be estimated by knowing the thermal noise level, N_LEVEL and received signal strength from all UEs that belongs to its own cell.
  MRNCR: The maximum RoT value that can be used for the privileged (e.g. the non-RACH carrier, FIG. 1) carrier C2 without risk for unstable power control loops in the cell. It is noted that MRCR<=MRNCR, typically.
  TMP_ROT_Cn a temporary calculated load value that can be calculated as follows:

Before any UE is allocated, initialization is performed as follows:

```
ROT_C1 = (N_LEVEL_C1 + IOC(1))/N_LEVEL_C1
ROT_C2 = (N_LEVEL_C2 + IOC(2))/N_LEVEL_C2
```

A temporary ROT value for a cell can be estimated when UE(Cn_INDEX) is allocated, by executing the following pseudo code. (Note that the 'FOR UE_INDEX=1 TO Cn_INDEX' is valid for C1. In case of C2 the row shall be changed to FOR UE_INDEX=N TO Cn_INDEX' where N is the number of UEs to be allocated).

```
TMP_ROT_Cn = ROT_Cn
UE_CARR(Cn_INDEX) = ROT_Cn * N_LEVEL_Cn * SIR(Cn_INDEX)
TMP_ROT_Cn = TMP_ROT_Cn + UE_CARR(Cn_INDEX)/
N_LEVEL_Cn
REPEAT
   CONVERGENCE_ROT = TMP_ROT_Cn
   FOR UE_INDEX = 1 TO Cn_INDEX
      TMP_CARR = (TMP_ROT_Cn * N_LEVEL_Cn –
UE_CARR(UE_INDEX)) * SIR(UE_INDEX)
      TMP_ROT_Cn = TMP_ROT_Cn + (TMP_CARR –
      UE_CARR(UE_INDEX))/N_LEVEL_Cn
      UE_CARR(UE_INDEX) = TMP_CARR
   NEXT UE_INDEX
UNTIL (TMP_ROT_Cn – CONVERGENCE_ROT) <
CONVERGENCE_REQ
```

Base Station

Figure 9:
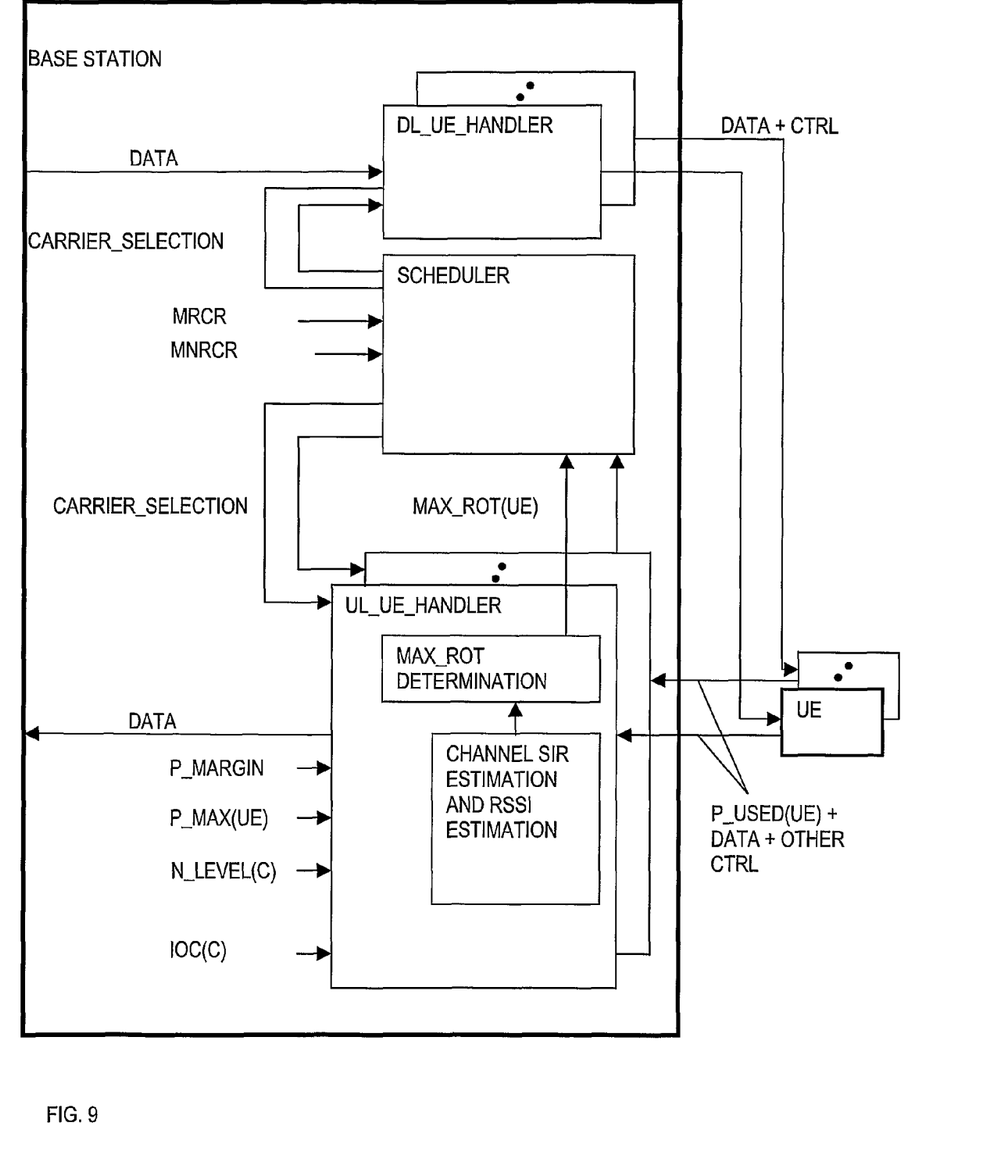
FIG. 9 shows a base station according to the invention.

In FIG. 9, a preferred embodiment of the base station (node B) according to the invention is shown.

The base station, node B, comprises a downlink user entity handler, DL_UE_HANDLER, a scheduler, and a plurality of up-link user entity handlers UL_UE_HANDLER. Each uplink handler comprises a MAX_ROT determination unit and a channel SIR and RSSI estimation unit.

Downlink data is conveyed to the downlink handler and transmitted according to the scheduling function to the various user entities in question.

Uplink data is received form the user entities and conveyed via the uplink handler further on to the backbone network (not shown).

The uplink handler performs various MAX_ROT determinations. Further, the scheduler uses the MRCR value and the MRNCR value together with information from UL_UE_HANDLER to determine the carrier allocation for each UE. Finally, the uplink handler and downlink handler is carrying out the resolved allocation or re-allocation of user entities as calculated in the scheduler.

The estimations performed by the respective units are made according to the foregoing definitions while the routine for performing the optimized allocation shall be dealt with in the following.

Routine

In FIG. 3, a flow diagram of the preferred embodiment of the invention is shown.

Figure 5:
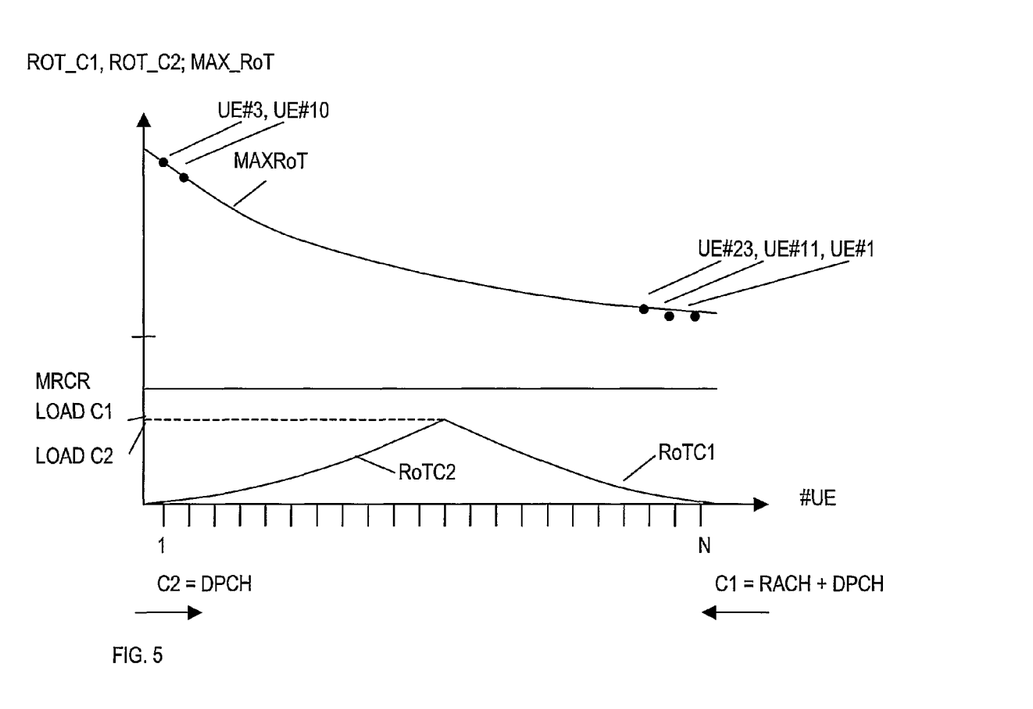
FIG. 5 is a schematic representation of first a scenario using the distribution routine of FIG. 3.

The method shall now be explained with reference to a first exemplary scenario given in FIG. 5.

The routine for carrier (re-)allocation takes place at predetermined intervals in order to optimize the throughput in the network. In step 1, such an interval has started.

In step 2, the-information on respective measures relating to the noise enduring capability, e.g. MAX_ROT(UEn), of respective prevalent users within the at least one of all prevalent user entities, 1-N, seeking access are gathered.

Moreover in step 2, respective measures relating to the noise enduring capability (MAX_ROT(UEn)) are estimated and sorted according to the found values, such that MAX_ROT(n)>MAX_ROT(n+1).

In step 3, index for carrier 1, C1_INDEX, is set to N and index of carrier 2, C2_INDEX, is set to 1. In step 4, the iteration number i is initially set to zero.

In step 5 it is judged whether ROT(C1_INDEX)<ROT (C2_INDEX). In the following, user entities are assigned generally interchangeably to carrier 1 and carrier 2, as illustrated in FIG. 5, whereby the user entities having the lowest ROTMAX values are assigned to carrier C1—in increasing order—while the user entities having the largest ROTMAX values are assigned to carrier C2—in decreasing order. In the present example, user entities UE#1, UE#11 and UE#23 becomes assigned to C1, while UE#3 and UE#10 becomes assigned to C2, after five iterations.

In the left hand column of FIG. 3, corresponding to steps 6-9, user entity candidates are examined for allocation to carrier C2, while in the right hand column, steps 11-14, user entity candidates are examined for allocation to carrier C1.

In step 11, given that step 5 was answered with YES, a temporary estimated load value, TMP_ROT is calculated corresponding to the load of earlier allocated candidates as well as the candidate user entity in question.

In step 12, if the temporary load is compared to MAX_ROT (N), corresponding to the lowest prevalent MAX_ROT value. If NO, the process continues with allocation of carrier 2.

In step 13, the temporary load value is compared to the predetermined maximum load for guaranteed RACH carrier operation. If less than the latter value, the process continues with step 14, if not, the process continues with step 6.

In step 14, the user entity of the given index is allocated to carrier 1 and the load for carrier 1, ROT_C1, is estimated. As appears from FIG. 6, the load is small for UEN=UE#2. Moreover the index for carrier allocation is decreased, C1_INDEX, is decreased in order, that is, the process is ready for the user entity having the next higher MAX_ROT.

Likewise, the user entities having the highest acceptable MAX_ROT values are allocated—in decreasing order—to the non-RACH carrier C2 according to steps 7-9.

If a temporary load value, TMP_ROT, is greater than the accepted load value of the candidate user, step 7, no more candidates can be allocated to the carrier and a congestion situation is detected, step 10.

The same applies for the optional step 8, where the temporary load value is tested for exceeding the value MRNCR, defined above.

In summary, the routine involves allocation of user entities to at least two carriers (C1; C2) in at least one cell (A; B) of a system (node B), the first carrier (C1) having at least a first channel (DPCH), the second carrier (C2) having at least a second channel (DPCH), the at least two carriers not causing interference to one another, wherein user entities (UE) may be selectively assigned to either first channel and/or the second channel. The routine comprises the steps of gathering information on respective measures relating to the noise enduring capability (MAX_ROT(UEn)) of respective prevalent users within the at least one cell, ordering the prevalent user entities according to their respective noise enduring capabilities (MAX_ROT(UEn)_UE), allocating or re-allocating user entities with low noise enduring capabilities to a channel on the first carrier (C1), while allocating or re-allocating user entities with high noise enduring capabilities (MAX_ROT(UEn)) to a channel on the second carrier (C2).

Figure 4:
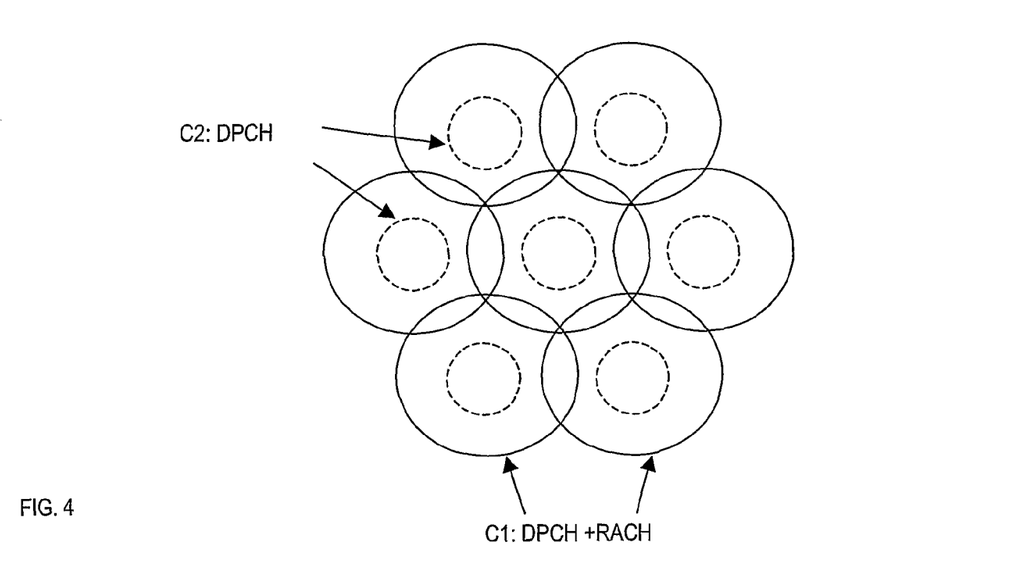
FIG. 4 shows a resulting cell coverage situation according to the invention.

The allocation of UEs performed according to the routine shown in FIG. 3 effectuates that those UEs that only can handle low ROT's are allocated to C1 while those UEs that can handle higher ROT's are allocated to C2. The scenario depicted in FIG. 4 corresponds to a scenario where all UEs can be allocated without the load in C1 (LOAD C1) being limited by MRCR or MAX_ROT(UE#1). In the given scenario, the routine will have the effect that the total load will be equally divided between C1 and C2. As is seen from the individual MAX_ROT(UEn) values,—in general—the coverage of C2 is less than the coverage of C1, since the users with the most privileged conditions are allocated to C2 and the users with the worst conditions (i.e. typically at the boundary of a cell) is allocated to C1.

It should be noted that the channel (re-)allocation need not be carried out at the particular time instant of step 14, but at another time for instance in step 10 or step 17. Hence, the allocation process described above may constitute a planning process. Moreover, the allocation routine pertains both to an allocation of not previously allocated users as well as a re-allocation of existing allocated users.

Figure 6:
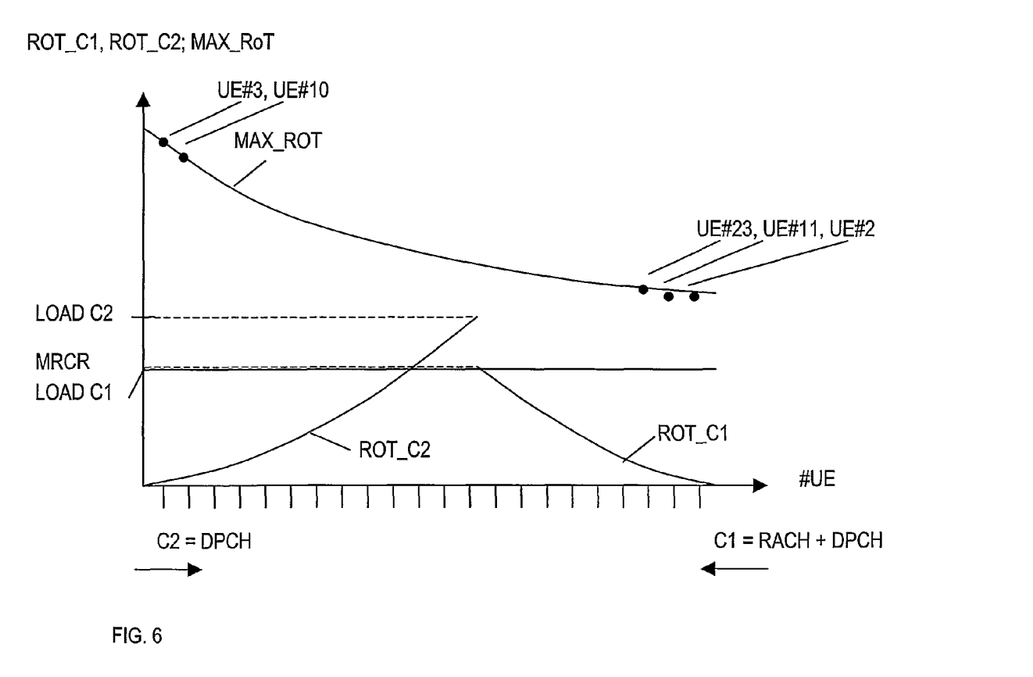
FIG. 6 is a schematic representation of a second scenario using the distribution routine of FIG. 3.

In FIG. 6, another scenario is shown.

The scenario depicted in FIG. 6 corresponds to a scenario where the load in C1 is limited by MRCR in order to ensure coverage for RACH. As long as the load in C1 is lower than MRCR, confer step 13 FIG. 3, the routine effects an allocation of UEs so that the temporary loads initially rise equally in C1 and C2. When the load in C1 reaches MRCR, all remaining UEs are allocated to C2. In this situation all UEs are allocated. The load in C1 is limited by the RACH coverage requirement.

Figure 7:
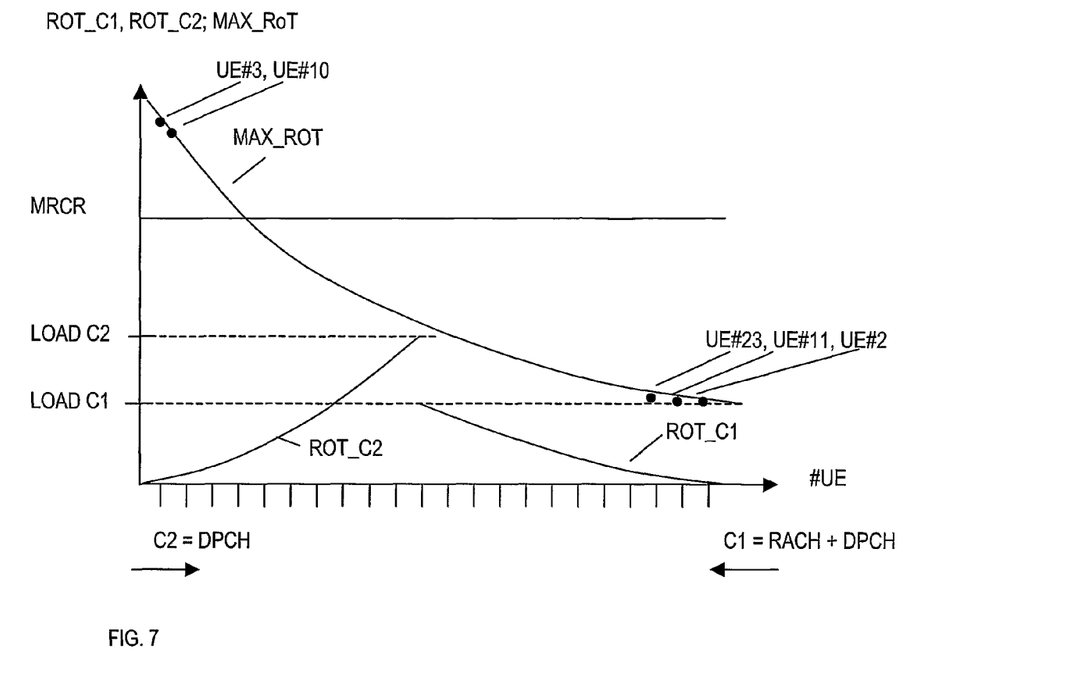
FIG. 7 is a schematic representation of a third scenario using the distribution routine of FIG. 3.

In FIG. 7, still another scenario is shown

The case depicted in FIG. 7 corresponds to a scenario where the load in C1 is limited by the UE (i.e. MAX_ROT (N)) with the lowest MAX_ROT value, confer step 12, FIG. 3. If the load in C1 had exceeded this lowest MAX_ROT value, the corresponding UE had been out of the cell range. As long as the load in C1 is lower than the lowest MAX_ROT, the system allocates UEs so that the loads rise equally in C1 and C2. Then, when the load in C1 reaches MAX_ROT, all the remaining UEs are allocated to C2. All UEs become allocated. The permitted MAX_RoT for UE #2 limits the load in C1

Figure 8:
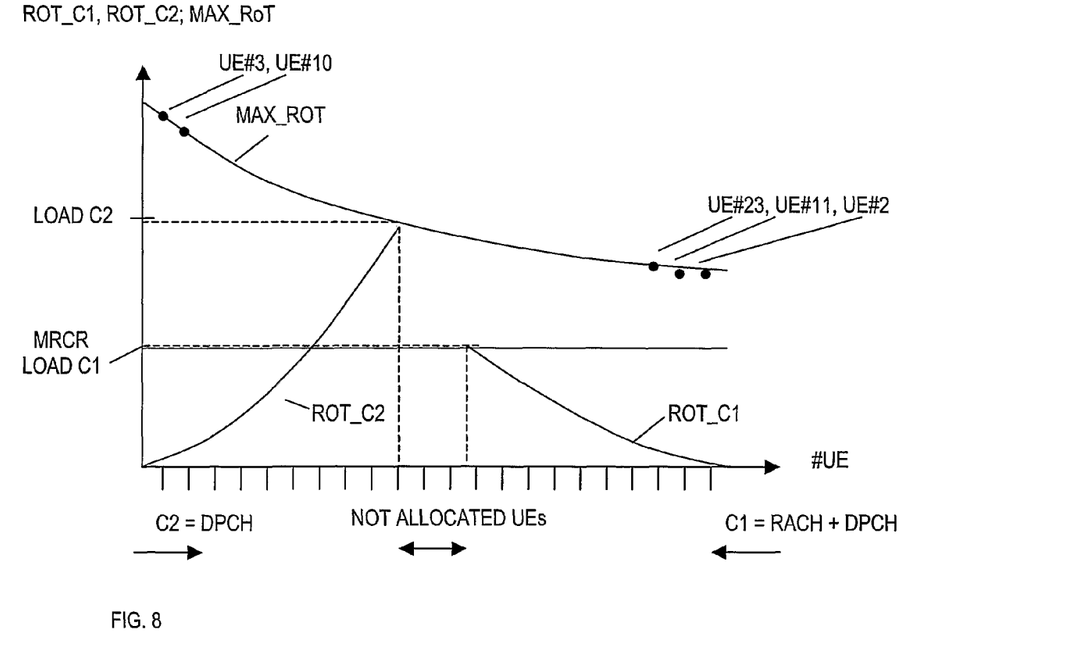
FIG. 8 is a schematic representation of a fourth scenario using the distribution routine of FIG. 3.

In FIG. 8, still another scenario is shown.

The case depicted in FIG. 8 corresponds to a scenario where not all UEs can be allocated to the cell. The load in C1 is limited by the MRCR value confer step 13 in order to ensure RACH coverage. Moreover, the load in C2 reaches a level corresponding to the MAX_ROT for the last allocated UE. Since all remaining non-allocated UEs have a MAX_ROT value that is lower than the TMP_ROT_C2 value, they cannot be allocated. Hence, a congestion situation is detected.

As long as the load in C1 is lower than MRCR, the routine of FIG. 3 effects that the load initially rise equally in C1 and C2. When the load in C1 reaches MRCR, the routine continues to allocate UEs to C2. However, the load in C2 reaches a level exceeding the MAX_ROT value of the user entity of corresponding index number, implicating that a number of UEs cannot be allocated.

In this situation other measures in the network can be taken such as to limit QoS for individual user entities.

Figure 2:
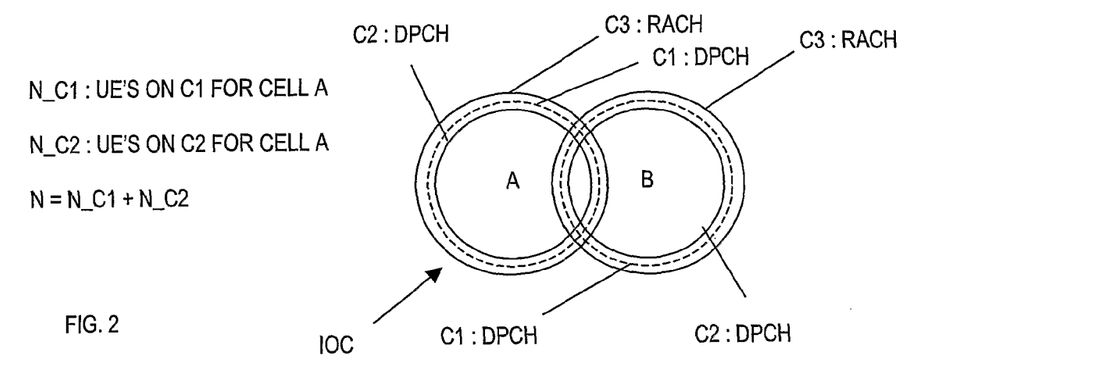
FIG. 2 shows a second embodiment of two cells of a cellular radio system according to the invention.

In FIG. 2, an alternative carrier allocation is shown in which the first carrier C1 has at least a first dedicated channel, DPCH, the second carrier C2 has at least a second dedicated channel DPCH and a third carrier C3 has a random access channel RACH. The random access carrier C3 is arranged to operate so as to provide full coverage. In case more cells are provided, the carrier of C3 provides advantageously a contiguous area for the reasons given above. The dedicated carrier C1 is a robust carrier aiming for larger coverage while the privileged carrier C2 is assigned specifically to the user entities having high noise enduring capabilities. Hence, the allocation mechanism set out above may also be used to distribute user entities to two dedicated channels.

According to the invention and in line with FIGS. 1 and 2, carrier C1 can also be referred to as a robust carrier while carrier C2 can be referred to as a privileged carrier.

As mentioned above, the path loss (UE to Node B) can vary substantially depending on the distance between UE and Node B as well as depending on whether the UE is indoor or outdoor. Moreover, the isolation between the own cell and the neighboring cell will differ substantially depending on the position of the UE. In the present description, the isolation between the own cell and a neighboring cell may be defined as follows: The path loss between the UE and Node B in a neighboring cell (in dB) minus the path loss between UE and Node B in 'own' cell (in dB).

By separating all UEs, so that all UEs with high path loss are allocated to the carrier that handle RACH and that all other UEs with low path loss are allocated to another carrier, the total data throughput can be increased substantially.

Hence, according to one aspect of the invention, the cell radius—or coverage—of at least one random access channel RACH and at least one dedicated channel is dynamically adapted with respect to the current load situation in a cell.

According to the invention, the following restrictions/possibilities occur from a network perspective:

For carrier C1 (with conservative setting of MAX_ROT) there should be full coverage in the network. I.e. it is always possible to perform soft handover between two neighboring cells. Moreover this carrier handles RACH.

For carrier C2 (where MAX_ROT is adapted to current load situation) the cell coverage is allowed to be restricted to such an extent that soft handover between cell A and B may not be possible to be performed Hence, the invention also concerns a cell plan operation for a system comprising at least one cell (A; B), wherein the at least one cell comprises at least two carriers carrying at least up-link traffic from user entities, the carriers not causing interference to one another, wherein user entities (UE) may be selectively assigned to either the first channel and/or the second channel, wherein user entities with low noise enduring capabilities are allocated to a channel on the first carrier (C1), while user entities with high noise enduring capabilities (MAX_ROT(UEn)) are allocated to a channel on the second carrier (C2).

In the cell plan the coverage of the first carrier (C1) is controlled to be higher than the coverage of the second carrier.

The cell plan operation also concerns a plurality of cells (A, B), having at least the same first carrier and the same second carrier in all cells, wherein the coverage area of first carriers (C1) form a contiguous area, while the coverage area of the second carriers (C2) form a cell pattern of a plurality of isolated cells.

By allocating user entities with robust MAX_ROT(UEn) to the C2 carrier, resources can be freed on the RACH carrier C1, thereby securing maximum coverage on the C1 carrier. Carrier 1 will handle UEs with high path loss while carrier 2 will handle UEs with low path loss. Thereby, the maximum data throughput for carrier 2 can be higher than the maximum data throughput for carrier 1. Moreover, by providing the specific allocation of UE on the two carriers C1+C2 the overall throughput can be maximized. This leads to a higher ROT can be used for C2 compared to if the UE allocation had been arbitrarily performed. A higher ROT is associated with a higher data throughput.

By determining the isolation and path loss for every UE, it is possible to individually optimize the prevalent UE at a given time instant to a proper carrier. Carriers that have UEs with large isolation and low path loss are able to use a higher MAX_ROT. By separating the UEs that need 'coverage' from the UEs that can establish higher C/I, the total trans-mission rate for all carriers can be raised compared to a system with carriers where this separation is not performed. By reducing the cell radius in the network, the isolation between cells in the network is increased. The shorter radius will also lead to that a higher C/I values. Thereby, higher data rates can be established.

EXAMPLE

One can define that maximum utilization of a channel corresponds to that 100% of the received power is signal power and 0% of the received power is noise.

Assume a conventional system with 2 carriers in which both carriers handle RACH and DPCH. In order to establish RACH coverage, MAX_ROT is selected to 3 dB. In other words: 50% of the received power is noise and 50% signal power. This means that the conventional system with 2 carriers utilize approximately 2*50%=100% transmission capacity. (Maximum transmission for the two carriers correspond to 2*100%=200%.)

In contrast, the system according to the preferred invention can be configured as follows: As illustrated in FIG. 1, carrier 1 handles RACH. For this reason coverage has to be guaranteed in the entire cell. Hence MAX_ROT is selected to typically 3 dB. Carrier 2 that does not handle RACH is controlled to handle UEs with low path loss exclusively. As shown above, MAX_ROT is adaptively set depending on the actual path loss (and isolation) for the handled UEs. E.g. MAX_ROT=10 dB. RoT=10 dB corresponds to 90% signal and 10% noise. The given simplified example according to the invention utilize approximately 50%+90%=140% of a given data throughput value.

This means that the transmission capacity for carrier 2 has been increased from 50% to 90%. Hence, the system according to the invention approximately offers an increased transmission capacity of 40% compared to the conventional system.

The invention claimed is:

1. A method in a base station of allocating user entities (UEs) to at least two carriers in at least one cell of a system, the first carrier having at least a first channel, the second carrier having at least a second channel, the at least two carriers not causing interference to one another, wherein user entities may be selectively assigned to either the first channel or the second channel, the method comprising the steps of:

gathering information on respective measures relating to the noise enduring capability (MAX-ROT(UEn)) of respective prevalent user entities within the at least one cell;

ordering the prevalent user entities according to their respective noise enduring capabilities (MAX_ROT(UEn)_UE);

allocating or re-allocating user entities with low noise enduring capabilities to a channel on the first carrier; and, allocating or re-allocating user entities with high noise enduring capabilities (MAX-ROT(UEn)) to a channel on the second carrier;

wherein the measures relating to the noise enduring capability (MAX_ROT(UEn)) of prevalent user entities (UEn) are estimated according to:

$$MAX\_ROT(UEn)=((P\_MAX(UEn)-P\_MARGIN)-(P\text{-}USED(UEn)-RSSI(UEn)))-SIR(UEn),$$

wherein:

RSSI(UEn) is the measured received signal strength for a specific UE;

PJJSED(UEn) is the used power for a specific UE;

P-MARGIN is a power margin to ensure that the connection can handle channel variations within a scheduling interval; and, SIR(UEn) is the measured signal to interference ratio for a specific UE.

2. A base station comprising:
a downlink user entity handler;
a scheduler; and,
an up-link user entity handler, which comprises a MAX_ROT determination unit and a channel SIR and RSSI estimation unit; wherein:
downlink data is conveyed to the downlink handler and transmitted according to a scheduling function to various user entities in question;
uplink data is received form the user entities and conveyed via the uplink handler; wherein:
the uplink handler performs the functions of:
gathering information on respective measures relating to the noise enduring capability (MAX_ROT(UEn)) of respective prevalent user entities within the at least one cell;
ordering the prevalent user entities according to their respective noise enduring capabilities (MAX_ROT(UEn)_UE);
allocating or re-allocating user entities with low noise enduring capabilities to a channel on the first carrier; and,
allocating or re-allocating user entities with high noise enduring capabilities (MAX-ROT(UEn)) to a channel on the second carrier;

wherein the measures relating to the noise enduring capability (MAX_ROT(UEn)) of prevalent user entities (UEn) are estimated according to:

$$MAX\_ROT(UEn) = ((P\_MAX(UEn) - P\_MARGIN) - (P\text{-}USED(UEn) - RSSI(UEn))) - SIR(UEn),$$

wherein:

RSSI(UEn) is the measured received signal strength for a specific UE;

PJJSED(UEn) is the used power for a specific UE;

P-MARGIN is a power margin to ensure that the connection can handle channel variations within a scheduling interval; and, SIR(UEn) is the measured signal to interference ratio for a specific UE.

* * * * *

UNITED STATES PATENT AND TRADEMARK OFFICE
CERTIFICATE OF CORRECTION

PATENT NO. : 8,179,866 B2
APPLICATION NO. : 12/089144
DATED : May 15, 2012
INVENTOR(S) : Carlsson It is certified that error appears in the above-identified patent and that said Letters Patent is hereby corrected as shown below:

On title page, item (57), under "ABSTRACT", in Column 2, Line 7, delete "(UE)" and insert -- (UEs) --, therefore.

On the title page, item (57), under "ABSTRACT", in Column 2, Line 10, delete "(MAX ROT(UEn))" and insert -- (MAX_ROT(UEn)) --, therefore.

In Column 6, Line 18, delete "the-information" and insert -- the information --, therefore.

In Column 6, Line 57, delete "UEN" and insert -- UEn --, therefore.

In Column 7, Line 56, delete "shown" and insert -- shown. --, therefore.

In Column 7, Line 67, delete "C1" and insert -- C1. --, therefore.

In Column 8, Line 62, delete "performed" and insert -- performed. --, therefore.

In Column 9, Line 33, delete "trans-mission" and insert -- transmission --, therefore.

In Column 10, Line 15, in Claim 1, delete "(MAX-ROT(UEn))" and insert -- (MAX_ROT(UEn)) --, therefore.

In Column 10, Line 25, in Claim 1, delete "(MAX-ROT(UEn))" and insert -- (MAX_ROT(UEn)) --, therefore.

In Column 10, Line 32, in Claim 1, delete "(P-USED" and insert -- (P_USED --, therefore.

In Column 10, Line 37, in Claim 1, delete "PJJSED" and insert -- P_USED --, therefore.

In Column 10, Line 38, in Claim 1, delete "P-MARGIN" and insert -- P_MARGIN --, therefore.

Signed and Sealed this
Twenty-second Day of January, 2013

David J. Kappos
*Director of the United States Patent and Trademark Office*

CERTIFICATE OF CORRECTION (continued)
U.S. Pat. No. 8,179,866 B2

In Column 10, Line 56, in Claim 2, delete "(MAX-ROT(UEn))" and insert -- (MAX_ROT(UEn)) --, therefore.

In Column 10, Line 66, in Claim 2, delete "(MAX-ROT(UEn))" and insert -- (MAX_ROT(UEn)) --, therefore.

In Column 11, Line 5, in Claim 2, delete "(P-USED" and insert -- (P_USED --, therefore.

In Column 12, Line 1, in Claim 2, delete "PJJSED" and insert -- P_USED --, therefore.

In Column 12, Line 2, in Claim 2, delete "P-MARGIN" and insert -- P_MARGIN --, therefore.